(12) United States Patent
Risbud et al.

(10) Patent No.: US 11,822,431 B2
(45) Date of Patent: Nov. 21, 2023

(54) MIGRATING DEDUPLICATION FILE SYSTEMS HAVING CLOUD UNITS FROM DIFFERENT CLOUD PROVIDERS

(71) Applicant: Dell Products L.P., Round Rock, TX (US)

(72) Inventors: Chetan Risbud, Milpitas, CA (US); Ashwani Mujoo, San Jose, CA (US); Srisailendra Yallapragada, Cupertino, CA (US); Mandar J. Kulkarni, Livermore, CA (US)

(73) Assignee: Dell Products, L.P., Round Rock, TX (US)

( * ) Notice: Subject to any disclaimer, the term of this patent is extended or adjusted under 35 U.S.C. 154(b) by 98 days.

(21) Appl. No.: 17/506,575

(22) Filed: Oct. 20, 2021

(65) Prior Publication Data
US 2023/0121708 A1 Apr. 20, 2023

(51) Int. Cl.
*G06F 11/14* (2006.01)
*G06F 16/22* (2019.01)

(52) U.S. Cl.
CPC ...... *G06F 11/1453* (2013.01); *G06F 11/1435* (2013.01); *G06F 11/1464* (2013.01); *G06F 11/1469* (2013.01); *G06F 16/2246* (2019.01); *G06F 2201/80* (2013.01)

(58) Field of Classification Search
None
See application file for complete search history.

(56) References Cited

U.S. PATENT DOCUMENTS

| 11,093,442 B1 * | 8/2021 | Bhutani | G06F 16/119 |
| 2021/0124645 A1 * | 4/2021 | Chinthekindi | G06F 11/0793 |
| 2021/0258267 A1 * | 8/2021 | Vishwakarma | H04W 28/0942 |

* cited by examiner

*Primary Examiner* — Eddy Cheung
(74) *Attorney, Agent, or Firm* — Staniford Tomita LLP

(57) ABSTRACT

Embodiments of a system and method for migrating data from a first cloud network provided from a first cloud service provider (CSP) and a second cloud network provided by a second CSP. The method reads and packs only live data containers from the first cloud using a Garbage Collection (GC) process. It performs a collection replication process replicating a local container set (CSET) from the first cloud network to the second cloud network, and replicates data containers from the first cloud network to the second cloud network. It then uses a container manager process to write data containers on the second cloud network.

20 Claims, 7 Drawing Sheets

MIGRATING DEDUPLICATION FILE SYSTEMS HAVING CLOUD UNITS FROM DIFFERENT CLOUD PROVIDERS

TECHNICAL FIELD

This invention relates generally to deduplication storage systems, and more particularly to migrating deduplication file systems having cloud units from different cloud providers.

BACKGROUND OF THE INVENTION

Cloud computing provides a shared pool of configurable computing resources (e.g., computer networks, servers, storage, applications and services) that can be rapidly provisioned and released with minimal management effort. Cloud computing allows users with various capabilities to store and process their data in either a private cloud or public cloud (e.g., third-party owned cloud network) in order to make data accessing mechanisms much more easy and reliable. Large-scale cloud computing infrastructure and services are often provided by cloud providers that maintain data centers that may be located long distances from many of the users. Cloud networks are widely used for large-scale data backup operations by enterprises that process large amounts of data on a regular basis, such as weekly or daily company-wide backups. Cloud storage (the "cloud tier") is typically provided by a cloud service provider that offers infrastructure, application, and storage services. Such services are typically available on a pay-per-use model and provide scalability and flexibility to user deployments.

Data deduplication is a form of single-instance storage that eliminates redundant copies of data to reduce storage overhead. Data compression methods are used to store only one unique instance of data by replacing redundant data blocks with pointers to the unique data copy. As new data is written to a system, duplicate chunks are replaced with these pointer references to previously stored data. Though storage requirements are greatly reduced, processing overhead is increased through the processes of deduplication. Certain deduplication file systems (e.g., DellEMC Data Domain) implement a multi-tiered deduplication file system that allows files to be moved between cloud and active tiers, while maintaining one namespace.

As hardware and infrastructure are routines updated, migrating data from older to newer systems is an important task to ensure business and operational continuity. Migrating deduplication file systems, such as Data Domain systems is presently supported through existing replication technologies, such as collection replication (CREPL) methods for DDFS. The collection replication protocol walks and replicates the whole container set (series of containers) from source to destination. This migration type of migration is straightforward when the source and destination are both supported by a single cloud service provider. In this case, the meta-separated architecture of the cloud tier in DDFS allows the metadata of files in the cloud tier to reside on the local storage connected to a DDR (Data Domain Restorer) and the real data of the files to reside on the cloud object store by the cloud service provider. This migration, however, does not work as well when the source and destination are each supported by different cloud service providers.

If a user has an old system with a cloud unit from provider X and needs to refresh its hardware plus move to a new cloud provider Y, there is presently no direct solution to move to the new provider. In this case, the user would need to read the whole data from the cloud unit X using some other form of replication, and replicate to the active tier of the new system. The data then needs to be moved to the cloud unit Y on the new system. This is extremely time consuming and involves multiple reads and writes during this process as the data has to hop to multiple places.

What is needed, therefore, is a method and system to efficiently migrate cloud units from sources and destinations supported by different cloud providers.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain and Data Domain Restorer are trademarks of Dell EMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

Figure 1:
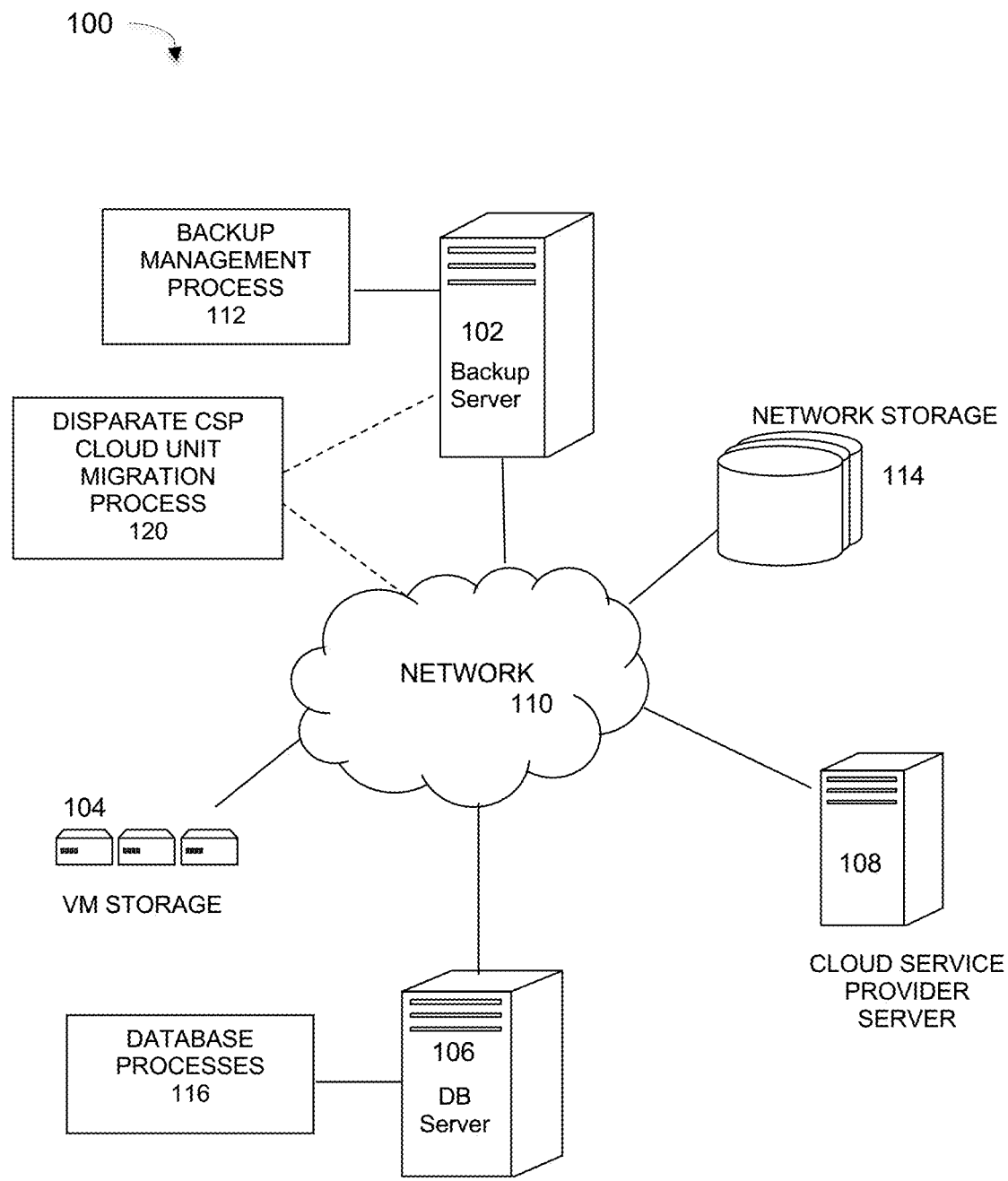
FIG. 1 is a diagram of a cloud computing network implementing a cloud unit migration process for source and destinations supported by disparate cloud services providers, under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Some embodiments of the invention involve software development and deployment in a distributed system, such as a cloud based network system or very large-scale wide area network (WAN), metropolitan area network (MAN), however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Embodiments are described for a system and method that automatically determines the configuration parameters needed to obtain optimal performance for a given backup/restore job in a data backup system. FIG. 1 illustrates a computer network system that implements one or more embodiments of a disparate cloud service provider data migration process, under some embodiments. In system 100, a backup server 102 executes a backup management process 112 that coordinates or manages the backup of data from one or more data sources, such as database server 106, to storage devices, such as network storage 114, client storage, and/or virtual storage devices 104. With regard to virtual storage 114, any number of virtual machines (VMs) or groups of VMs (e.g., organized into virtual centers) may be provided to serve as backup targets. The VMs or other network storage devices serve as target storage devices for data backed up from one or more data sources, such as backup server 102, in the network environment.

The network server computers are coupled directly or indirectly to the data storage 114, target VMs 104, and the data sources and other resources through network 110, which is typically a cloud network (but may also be a LAN, WAN or other appropriate network). Network 110 provides connectivity to the various systems, components, and resources of system 100, and may be implemented using protocols such as Transmission Control Protocol (TCP) and/or Internet Protocol (IP), well known in the relevant arts. In a cloud computing environment, network 110 represents a network in which applications, servers and data are maintained and provided through a centralized cloud computing platform.

In an embodiment, cloud network 110 may be a private network or it may be a public network provided by a third-party cloud service provider (CSP) 108. In this case, at least part of the infrastructure of network 110, such as servers, routers, interfaces and so on are provided to users such as backup server 102 as an IaaS (Infrastructure as a Service), SaaS (Software as a Service), PaaS (Platform as a Service), or other type of arrangement. The cloud provider 108 may be any company such as Amazon, EMC, Apple, Cisco, Citrix, IBM, Google, Microsoft, Salesforce.com, and so on. Depending on implementation, each cloud provider may show up as a cloud tier inside the file system for the user, such as the Data Domain file system. The cloud tier will have one or more cloud units that are used for data migration and storage using migration, copying, duplication, long-term retention (LTR), and other processes. Any number of cloud service providers may be present depending on the configuration of the data sources and destinations in network 100.

The data generated or sourced by system 100 and transmitted over network 110 may be stored in any number of persistent storage locations and devices. In a backup case, the backup management process 112 causes or facilitates the backup of this data to other storage devices of the network, such as network storage 114, which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays. The data sourced by the data source (e.g., 106) may be any appropriate data, such as database data that is part of a database management system, and the data may reside on one or more hard drives for the database(s) 116 in a variety of formats. In an embodiment, system 100 may represent a Data Domain Restorer (DDR)-based deduplication storage system, and storage server 128 may be implemented as a DDR Deduplication Storage server provided by EMC Corporation. However, other similar backup and storage systems are also possible.

As shown in FIG. 1, a server or cloud-based component 120 executes a data migration process that migrates cloud unit data from source and destinations supported by different cloud service providers. For purposes of this description, cloud tier storage refers to network or cloud implemented storage media that is used to store data for archival or long-term storage purposes and that imposes a cost in terms of provider fees and/or resource overhead to access; while active tier storage refers to storage that may be faster and smaller than cloud storage, but that is readily accessible and used for temporary storage or present processing of data.

Replication in a Data Domain system can generally be divided into two types, one is Data. Domain Native Replication which is controlled by Data Domain, and the other is Managed File Replication in which is controlled by the backup software. The Data Domain replication feature is typically more efficient, because it only copies the deduplication and compression data, and the source device only sends an index of replication data to the target device. If the index already exists, the target device will create a file and refer to the existing index; if the index does not exist, the source device will send replication data segments to the target device, and sending the index only takes up a small amount of network bandwidth. Data Domain Native replication has three replication types: Directory, Mtree and Collection that copy files, entire directories, or the file system itself. Once configured and initialized, the replication will automatically run. Directory replication copies subdirectories, Mtree replication copies other Mtrees, while collection replication copies the entire file system. For Collection replication, the content to be sent is based on block-level change. If any block of file system is changed, then the source DD sends the change to the destination DD immediately; it cannot be resynced, and the DD can have only one collection replication context configured.

As stated above, collection replication (CREPL) is one type of replication that supports present web unit migration in Data Domain systems. The collection replication protocol walks and replicates the whole container set (series of containers from source to destination). A container set is a storage layout of the DDFS, and the "container" is the basic building block of the container set, also known as CSET, which can store data or metadata of the files.

At present, collection replication is optimized for migration of the cloud-enabled DDRs having the same cloud providers for the source and destination, or on an old system and new system for an upgrade or tech refresh scenario, where a tech refresh may be an automated process of upgrading user's older DD system to a newer DD system. This same cloud provider migration is straightforward because of the meta-separated architecture of the cloud tier in DDFS, where metadata of the files in the cloud tier resides on the local storage connected to DDR and the real data of the files resides on the real cloud (e.g., object store by the cloud provider). So, collection replication only needs to replicate the old/source DDR's cloud metadata CSET to the destination's newly created empty local CSET. It does not need to replicate the real data stored in the cloud. The destination system with the replicated CSET can be easily connected to the same old cloud provider, and then the whole old cloud unit's data is available on the migration destination system's cloud unit. This advantage is generally only possible only when both the systems have same cloud provider-based cloud unit.

With regard to the meta-separated architecture, a file is stored in the BTree format, where the smallest identifiable chunk of the file is represented by a segment, and leaf segments represent the data portion of the files. Other segments in the tree are called metadata segments. In DDFS, the active unit or active collection partition (CP) stores all of a file's metadata, all of the segments, and the BTree of the segments in the same storage unit. However, this architecture is modified for cloud units or cloud CPs, where a CP is a collection partition in DDFS terms, or simply a storage unit in other systems. Files belonging to the cloud units, are stored differently. Metadata segments are stored in the local cloud unit's storage however, the leaf segments are stored in the real cloud. This architecture is called meta-separated architecture.

Figure 2A:
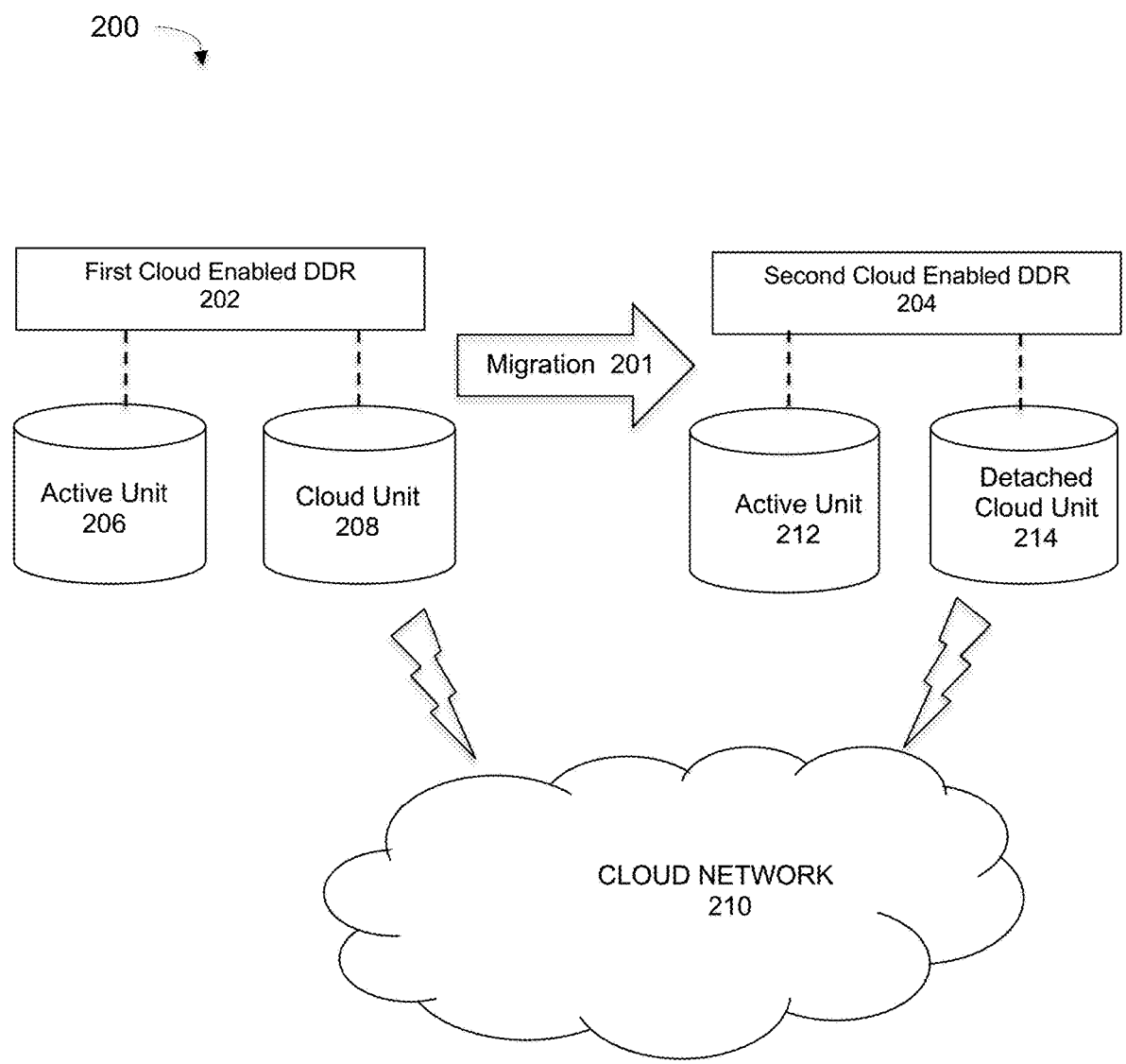
FIG. 2A illustrates a cloud unit migration scenario for source and destinations having the same cloud provider, under some embodiments.

FIG. 2A illustrates a cloud unit migration scenario for source and destinations having the same cloud provider, under some embodiments. As shown in FIG. 2A, system 200 includes a first cloud-enabled DDR 202 and a second cloud-enabled DDR 204. Each DDR respectively has an active cloud unit 206, 212, and a cloud unit 208, 214. A single cloud network 210 or cloud infrastructure provided by a single cloud service provider supports the cloud unit 208 for DDR 202 and the detached cloud unit 214 for DDR 204.

A data migration operation 201 from the source DDR 202 to the destination DDR 204 since the same cloud or same cloud provider does not have to process the real data in the cloud 210. The destination system 204 can be connected to the same cloud provider once the CSET is replicated.

There is, however, a significant increase in QoS (Quality of Service) in the case that different cloud providers support the source and destination DDRs. Given the move toward users seeking different cloud providers to optimize usage costs and other factors such as maintenance, reliability, investments, and so on, efficiently migrating data is increasingly important for systems with disparate cloud service providers.

For example, under current systems, if a user with a cloud unit from a first cloud provider needs to move data to a destination with a second cloud provider, the user would need to read the whole data from the first cloud unit using some other form of replication, replicate to the active tier of the new system, then move that data to a cloud unit on the new system. This is extremely time consuming and involves multiple reads and writes during this process as the data has to hop at multiple places.

Figure 2B:
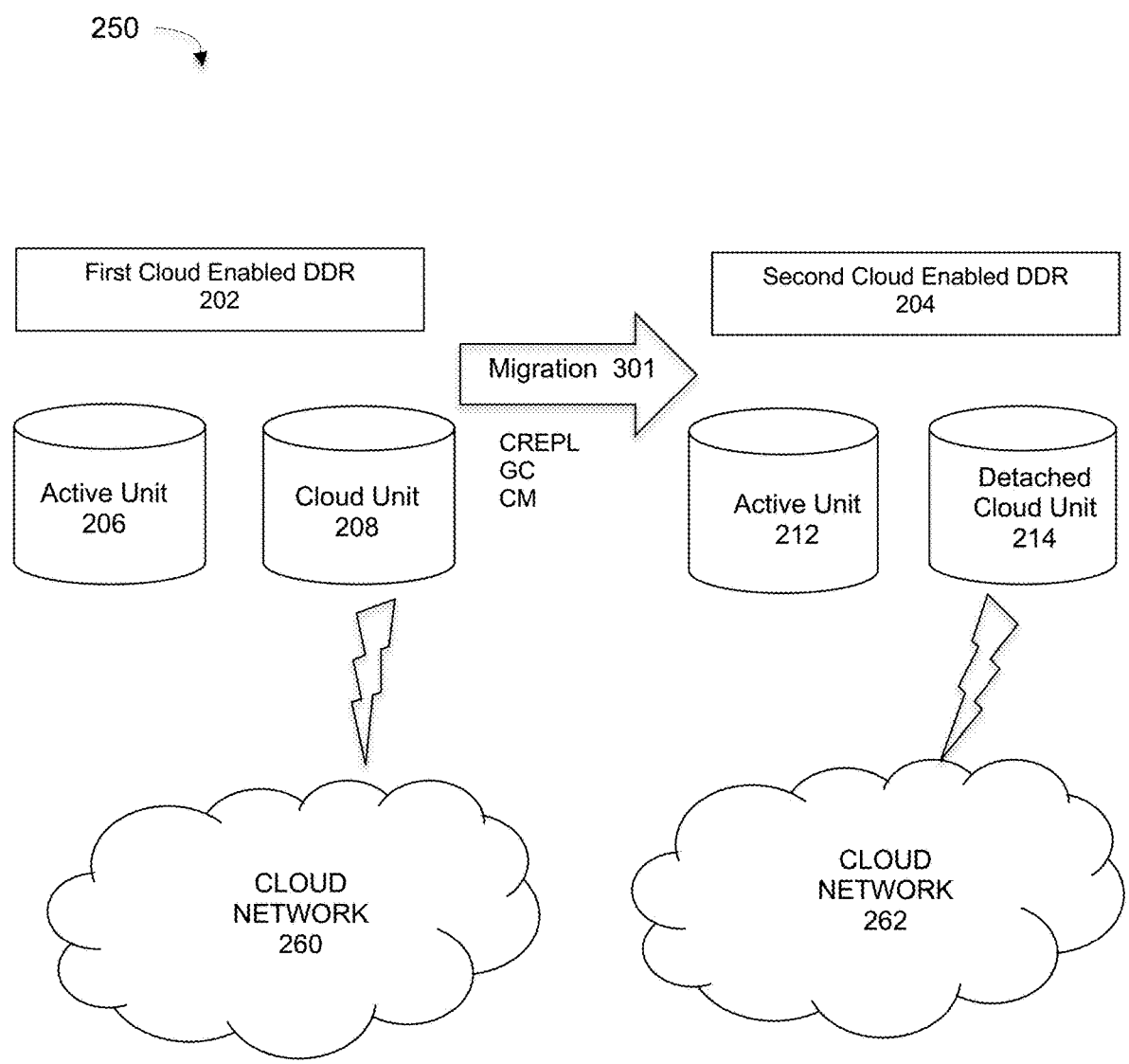
FIG. 2B illustrates the data migration scenario of FIG. 2 with disparate cloud providers, under an example embodiment.

FIG. 2B illustrates the data migration scenario of FIG. 2A with disparate cloud providers, under an example embodiment. As shown in FIG. 2B, system 250 includes a first cloud network 260 for the source DDR 202 and a second cloud network 262 for the source DDR 204, where the cloud networks 260 and 262 are provided by two different cloud providers. For example, the source DDR 202 may use an AWS cloud network while the destination DDR 204 may use an ECS provided cloud.

In an embodiment, the cloud unit migration process 120 maintains a degree of efficiency for a migration process 301 from the source and destination in the disparate cloud service provider scenario of FIG. 2B. Embodiments make use of the replication technology of CREPL and the meta-separated architecture of the cloud tier in DDFS.

Figure 3:
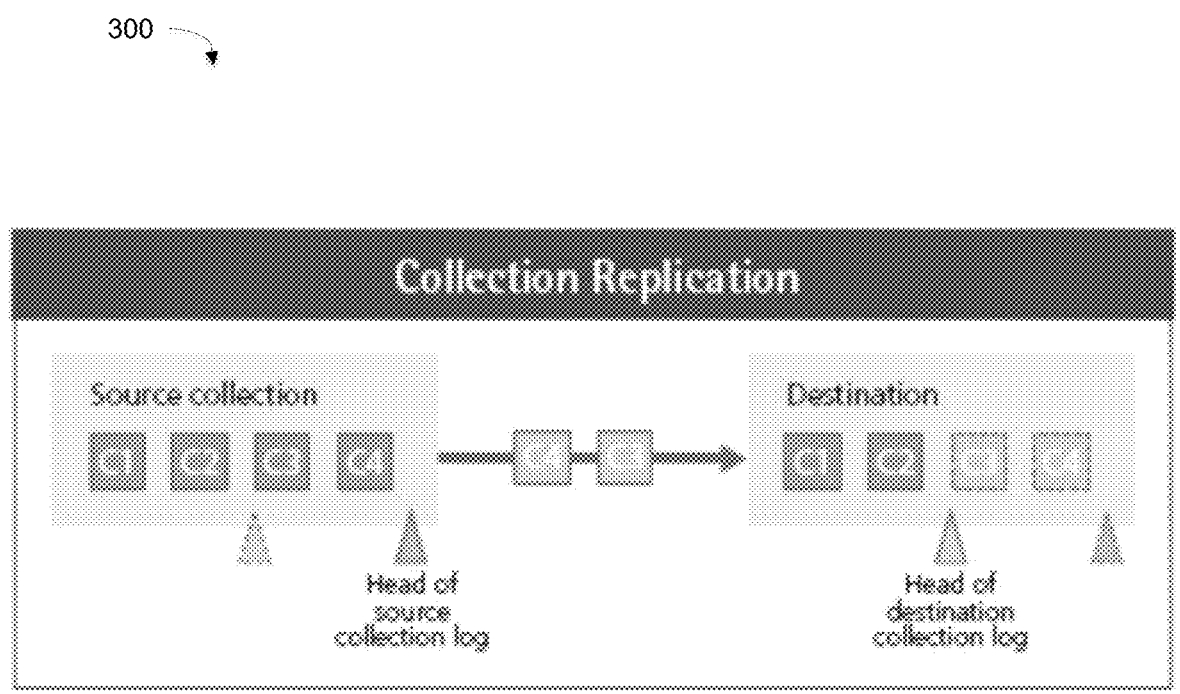
FIG. 3 illustrates a collection replication (CREPL) process, under some embodiments.

The present CREPL implementation in DDFS technology can read and replicate any type of the containers from the source's local CSET to the destination's local CSET. FIG. 3 illustrates a collection replication (CREPL) process, under some embodiments. Collection replication is generally the fastest and lightest impact replication type in DDFS. CREPL operates on segment locality containers that are sent once they are closed. By leveraging the log structure of the collection, collection replication tracks the delta between the head of the source and destination collections, and transfers each container containing unique segments, in order, until it catches up, as shown in diagram 300 of FIG. 3.

The collection's container set is a log structure. Transferring data in this way means simply comparing the heads of the source and destination logs, and catching up one container at a time, as shown in FIG. 3. If it gets behind, it will catch up later. This approach is very well adapted to enterprise deployments wishing to minimize the resource overhead of the selectivity and cross-site filtering overheads of directory or MTree replication (for example for very large disaster recovery (DR) deployments using high-bandwidth WANs), or systems containing millions of files in an archiving deployment.

Embodiments of process 120 use an enhanced CREPL embodiment to read the data containers from the real cloud X and replicate this data to the destination, where it can write them to cloud Y provided by a different cloud provider.

Under this embodiment, the CREPL engine is used to efficiently read the real data containers from the cloud because the reads from the cloud are expensive. To prevent the CREPL process from spending too much time and cost reading unnecessary cloud data containers, which may be dead in the log structured DDFS layout, a Garbage Collection (GC) process is used in combination with CREPL.

Garbage Collection (e.g., Expunge) is a technology to collect the dead data segments in the log structured filesystem, like DDFS. Garbage collection (GC) processes use perfect hash functions with fingerprints to track the live segments in the system. A general garbage collection (GC) procedure can be summarized as follows in terms of steps it performs: (1) enumeration: identify all the live segments; (2) filter: remove duplicate segments and preserve the one with highest container ID; (3) select: compute the liveness of each container and determine the cutoff liveness percentage; and (4) copy: copy forward the live segments from the selected containers.

Garbage Collection technology in DDFS which provides a way to enumerate the whole namespace and all the files physically. It also supports the files residing in the cloud unit. It can enumerate the data containers for the files in the real cloud, and can ensure reading and packing only the "live" data while reading. Such a process may be referred to as "cloud GC."

To migrate the DDR from the first CSP cloud network (source) to the second CSP cloud network (destination), process 120 deploys the cloud GC's physical enumeration algorithm to find and read the cloud data containers. The CREPL process already provides the basic infrastructure of remote procedure calls (RPCs) and the transport mechanism for different types of the containers to send them to the destination.

For CREPL, all the basic building blocks of the DDFS, (i.e., 'containers') are replicated to the destination in the same order as that of source system. CREPL performs some massaging of the container's data before transferring to the destination. However, in the case where the source and destination have different cloud service providers, some additional modifications to the container data are required before replication. For this embodiment, CREPL is enhanced to provide a so-called 'enhanced CREPL' process depicting the additional behavior over the basic CREPL process.

In an embodiment, the enhanced CREPL implementation recognizes these new types of containers from the first cloud providers and replicates them to the destination. It hands them over to a container management (CM) process, which is a software layer that deals with writing the containers to the disk and the cloud). In the file system stack of a DDFS system, the CM is a software layer that manages the reads and writes of the basic building blocks in the DDFS filesystem. It also provides interfaces to walk over the list of containers in the specific order. The CM process basically deals with reading and writing the basic building blocks of the DDFS. It can unpack the container and write it to the new CSP provided cloud with appropriate details attached.

The container manager is already equipped to pack the data containers and write them to the real cloud, where the 'real' cloud denotes the cloud storage and gateway to access that cloud storage from different providers, such as AWS, Azure, Google Cloud, and so on. Some data conditioning, such as to handle different object sizes by different CSPs, and so on, may be needed for data read from the first CSP cloud before writing it to the second CSP cloud, depending on system configuration.

Figure 4:
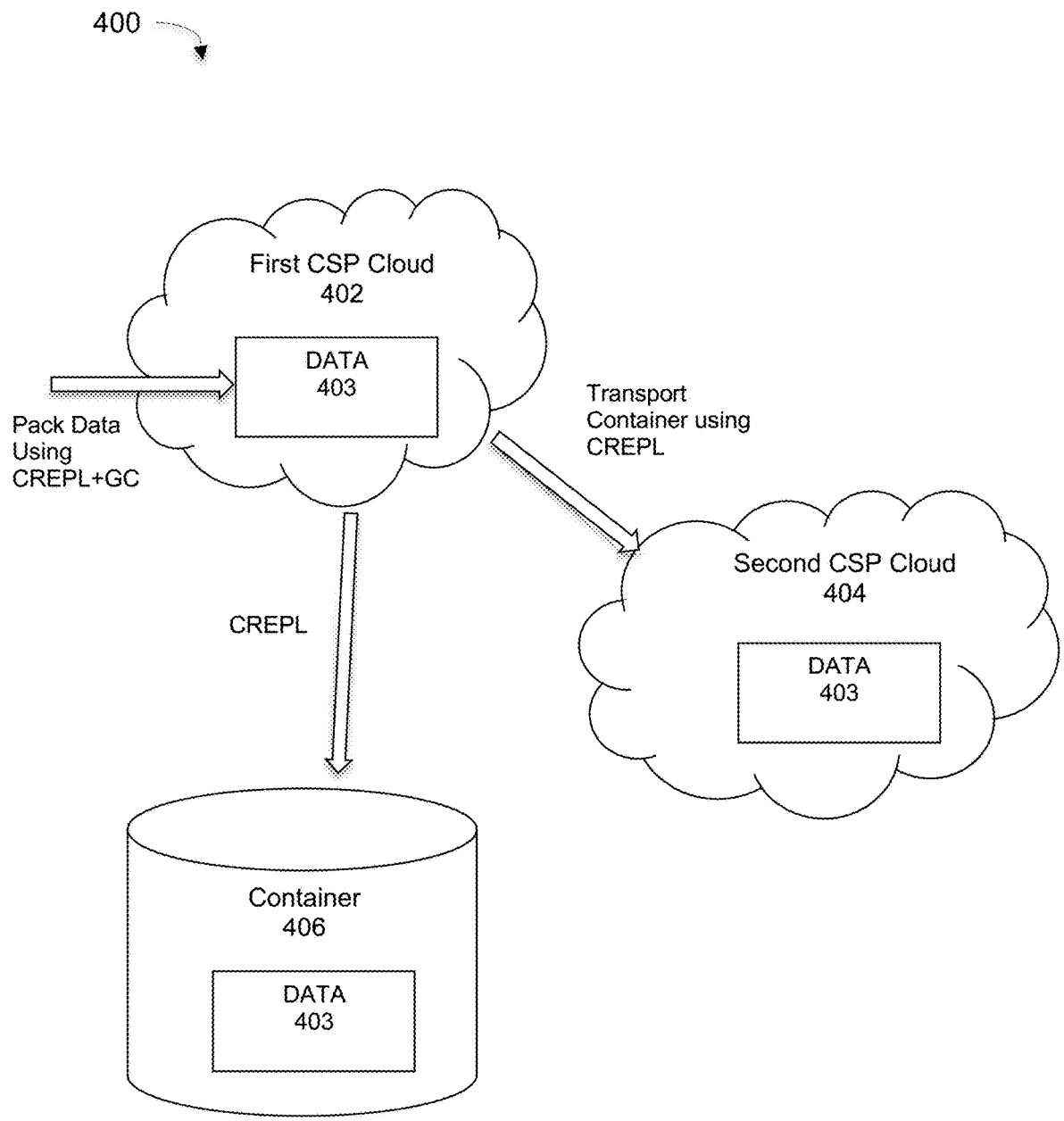
FIG. 4 is a diagram that illustrates a method of migrating cloud units using CREPL plus garbage collection and container manager processes, under some embodiments.

FIG. 4 is a diagram that illustrates a method of migrating cloud units using CREPL plus garbage collection and container manager processes, under some embodiments. As shown in FIG. 4, system 400 comprises a first CSP cloud 402 and a second CSP cloud 404. Data 403 is to be migrated from cloud 402 to cloud 404. The data in the first cloud 402 is packed using a combination of CREPL plus Garbage Collection processes. The GC process reads all of the live data in the cloud units of the container. The data is then transported from the first cloud 402 to the second cloud 404 using CREPL. The data is transported from the cloud, and not the local (active) tier. The process goes to the cloud as if tiered. The CM to the cloud access layer uses a respective CSP protocol (e.g., S3, ECS, Azure, etc.). Data is read from the first cloud and migrated to the second (new) system containers using CM to tier to the cloud, where tiering to the cloud is performed using the container manager.

Figure 5:
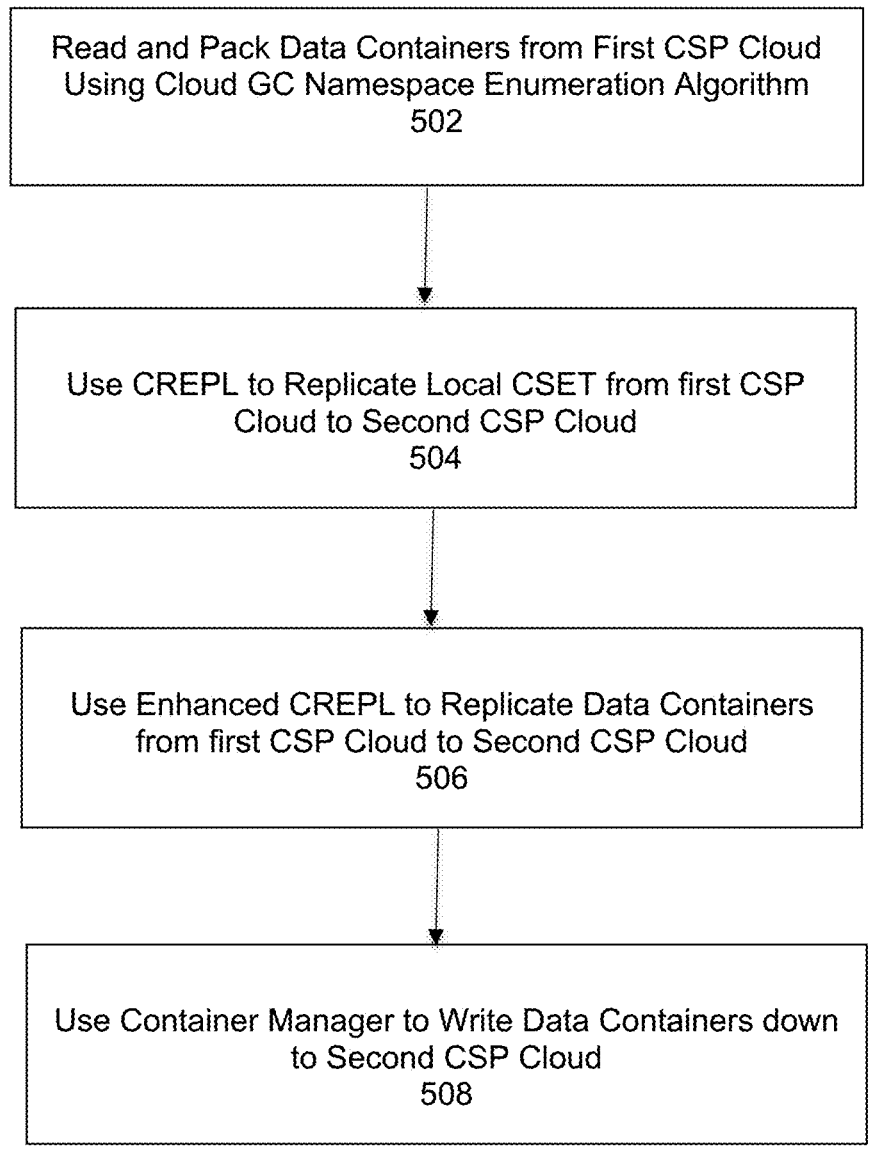
FIG. 5 is a flowchart illustrating a method of migrating cloud units using CREPL plus garbage collection and container manager processes, under some embodiments.

FIG. 5 is a flowchart illustrating a method of migrating cloud units using CREPL plus garbage collection and container manager processes, under some embodiments. Process 500 of FIG. 5 achieves a data migration from one cloud provider DDR to another cloud provider DDR. The process first uses a cloud GC (physical) namespace enumeration algorithm to read and pack the data containers from the first CSP cloud, 502. The namespace enumeration algorithms walks all of a file's BTree layout and finds the leaf segments in the layout which are the data containers of the files. DDFS stores the files in the BTree layout, and containers are the basic building blocks of the file system.

The process uses an existing CREPL process to replicate the local CSET from the first CSP cloud (source system) to the second CSP cloud (destination system), 504.

The process uses an enhanced CREPL process to replicate the data containers from the first CSP's cloud to the second CSP's cloud, 506.

The process then uses the container manager process to write the data containers down the second CSP cloud on the new system, 508.

This solution solves the user-centric problem of migrating data when dealing with multiple cloud providers. Given that the usage of cloud storage is growing, there is an increased demand for higher processing speeds, better hardware, better storage, and better cloud technologies. This will necessitate tech refresh migrations to upgrade old Data Domain systems with newer Data Domain systems and explore different cloud providers.

Embodiments may be provided as an integrated with existing data migration plus tech refresh process, where users can drive the process themselves without requiring customer service support. As a direct solution integrated with migration technology, embodiments can help save multiple operations of the data from an old system's cloud unit to the new cloud unit from a different cloud provider. In case of terabytes (TBs) of data for a cloud unit, this could save upwards of two weeks' time at present processing capabilities.

Embodiments of the processes and techniques described above can be implemented on any appropriate backup system operating environment or file system, or network server system. Such embodiments may include other or alternative data structures or definitions as needed or appropriate.

Figure 6:
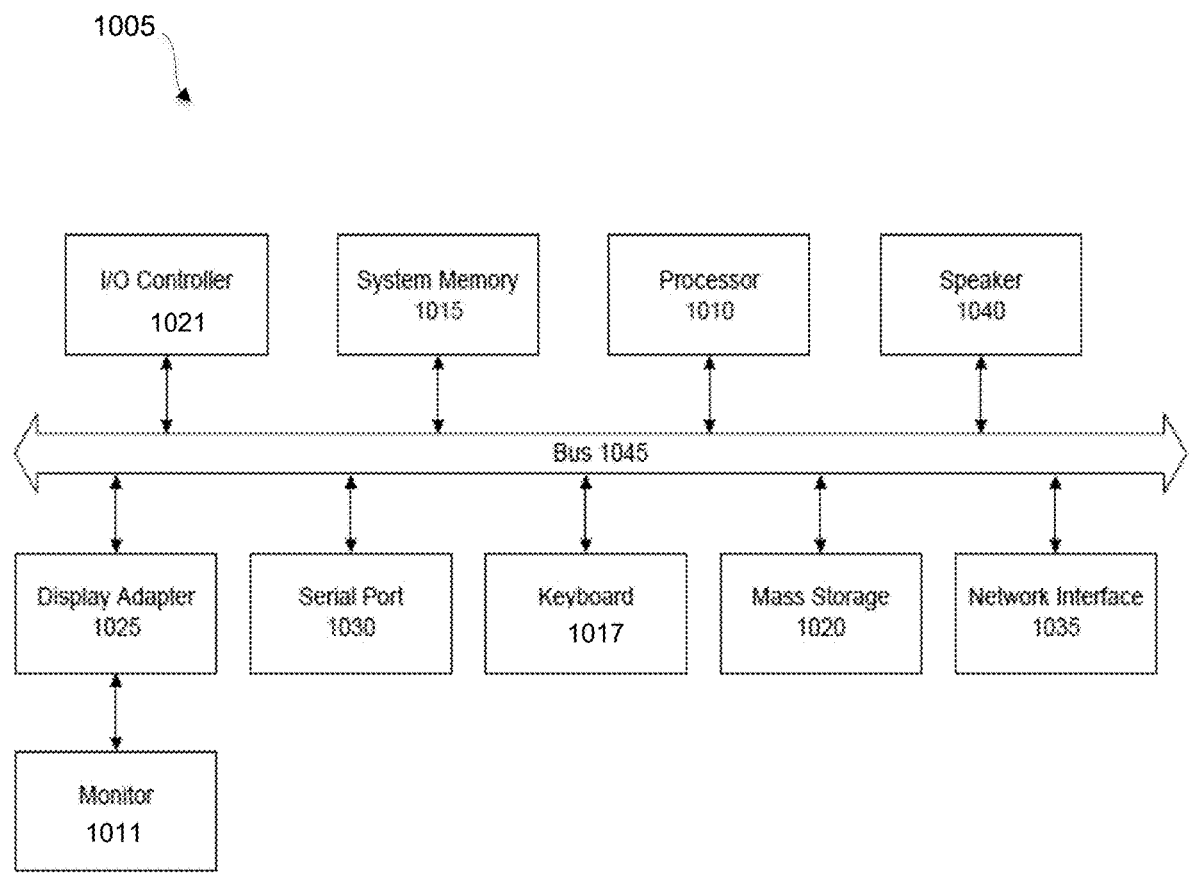
FIG. 6 is a system block diagram of a computer system used to execute one or more software components of a disparate CSP data migration process, under some embodiments.

The network of FIG. 1 may comprise any number of individual client-server networks coupled over the Internet or similar large-scale network or portion thereof. Each node in the network(s) comprises a computing device capable of executing software code to perform the processing steps described herein. FIG. 6 shows a system block diagram of a computer system used to execute one or more software components of the present system described herein. The computer system 1005 includes a monitor 1011, keyboard 1017, and mass storage devices 1020. Computer system 1005 further includes subsystems such as central processor 1010, system memory 1015, I/O controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1005. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1005 shown in FIG. 7 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system 1005 may be one of the Microsoft Windows®. family of systems (e.g., Windows Server), Linux, Mac OS X, IRIX32, or IRIX64. Other operating systems may be used. Microsoft Windows is a trademark of Microsoft Corporation.

The computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, among other examples), near field communication (NFC), radio-frequency identification (RFID), mobile or cellular wireless. For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of migrating data from a first cloud network provided from a first cloud service provider (CSP) and a second cloud network provided by a second CSP, comprising:

reading and packing only live data containers from the first cloud network using a Garbage Collection (GC) process;

performing a collection replication (CREPL) process replicating a local container set (CSET) from the first cloud network to the second cloud network;
performing an enhanced CREPL process replicating data containers from the first cloud network to the second cloud network, wherein the enhanced CREPL process is configured to recognize containers from the first cloud network; and
using a container manager process working with the enhanced CREPL process to write data containers on the second cloud network.

2. The method of claim 1 wherein the data migration comprises part of a deduplication backup process executed by a data storage server running a Data Domain file system (DDFS).

3. The method of claim 2 wherein the data migration comprises part of a tech refresh operation to upgrade an older DDFS system to a newer DDFS system with a different cloud service provider.

4. The method of claim 3 wherein the DDFS comprises a cloud tier having a metadata-separated architecture of a cloud tier.

5. The method of claim 4 wherein the metadata-separated architecture comprises storing metadata in a local storage of a cloud unit and storing data segments referenced by the metadata in cloud storage of the cloud unit.

6. The method of claim 1 wherein the Garbage Collection process executes a namespace enumeration process to walk all of a file's BTree layout and find leaf segments in the layout that are data containers of files in the first cloud network.

7. The method of claim 1 wherein the container manager comprises a software layer that writes data containers to a local disk storage and cloud networks.

8. A computer-implemented method of upgrading an older deduplication file system to a newer deduplication file system with a different cloud service provider, comprising:
reading and packing only live data containers from a first cloud supported by a first cloud service provider (CSP) using a Garbage Collection (GC) process;
performing a collection replication (CREPL) process replicating a local container set (CSET) from the first cloud network to the second cloud network;
performing an enhanced CREPL process replicating data containers from the first cloud network to the second cloud network, wherein the enhanced CREPL process is configured to recognize containers from the first cloud network; and
using a container manager process working with the enhanced CREPL process to write data containers on the second cloud network.

9. The method of claim 8 wherein the data migration comprises part of a deduplication backup process executed by a data storage server running a Data Domain file system (DDFS).

10. The method of claim 9 wherein the DDFS comprises a cloud tier having a metadata-separated architecture of a cloud tier.

11. The method of claim 10 wherein the metadata-separated architecture comprises storing metadata in a local storage of a cloud unit and storing data segments referenced by the metadata in cloud storage of the cloud unit.

12. The method of claim 9 wherein the GC process executes a namespace enumeration process to walk all of a file's BTree layout and find leaf segments in the layout that are data containers of files in the first cloud network.

13. The method of claim 9 wherein the container manager comprises a software layer that writes data containers to a local disk storage and cloud networks.

14. A computer program product, comprising a non-transitory computer-readable medium having a computer-readable program code embodied therein, the computer-readable program code adapted to be executed by one or more processors to implement a method of migrating data from a first cloud network provided from a first cloud service provider (CSP) and a second cloud network provided by a second CSP, the method comprising:
reading and packing only live data containers from the first cloud using a Garbage Collection (GC) process;
performing a collection replication (CREPL) process replicating a local container set (CSET) from the first cloud network to the second cloud network;
performing an enhanced CREPL process replicating data containers from the first cloud network to the second cloud network, wherein the enhanced CREPL process is configured to recognize containers from the first cloud network; and
using a container manager process working with the enhanced CREPL process to write data containers on the second cloud network.

15. The computer program product of claim 14 wherein the data migration comprises part of a deduplication backup process executed by a data storage server running a Data Domain file system (DDFS).

16. The computer program product of claim 15 wherein the data migration comprises part of a tech refresh operation to upgrade an older DDFS system to a newer DDFS system with a different cloud service provider.

17. The computer program product of claim 16 wherein the DDFS comprises a cloud tier having a metadata-separated architecture of a cloud tier.

18. The computer program product of claim 17 wherein the metadata-separated architecture comprises storing metadata in a local storage of a cloud unit and storing data segments referenced by the metadata in cloud storage of the cloud unit.

19. The computer program product of claim 15 wherein the Garbage Collection process executes a namespace enumeration process to walk all of a file's BTree layout and find leaf segments in the layout that are data containers of files in the first cloud network.

20. The computer program product of claim 15 wherein the container manager comprises a software layer that writes data containers to a local disk storage and cloud networks.

* * * * *